(12) United States Patent
Hasegawa et al.

(10) Patent No.: US 9,617,614 B2
(45) Date of Patent: *Apr. 11, 2017

(54) METHOD FOR MANUFACTURING HIGH STRENGTH STEEL SHEET HAVING EXCELLENT FORMABILITY

(71) Applicant: JFE Steel Corporation, Tokyo (JP)

(72) Inventors: Hiroshi Hasegawa, Tokyo (JP); Yoshiyasu Kawasaki, Tokyo (JP); Tatsuya Nakagaito, Tokyo (JP); Shinjiro Kaneko, Tokyo (JP); Yasunobu Nagataki, Tokyo (JP)

(73) Assignee: JFE Steel Corporation (JP)

( * ) Notice: Subject to any disclaimer, the term of this patent is extended or adjusted under 35 U.S.C. 154(b) by 455 days.

This patent is subject to a terminal disclaimer.

(21) Appl. No.: 14/351,943

(22) PCT Filed: Oct. 17, 2012

(86) PCT No.: PCT/JP2012/006649
§ 371 (c)(1),
(2) Date: Apr. 15, 2014

(87) PCT Pub. No.: WO2013/061545
PCT Pub. Date: May 2, 2013

(65) Prior Publication Data
US 2014/0360632 A1 Dec. 11, 2014

(30) Foreign Application Priority Data
Oct. 24, 2011 (JP) ................. 2011-232600

(51) Int. Cl.
*C21D 8/02* (2006.01)
*C21D 8/04* (2006.01)
*C21D 9/46* (2006.01)
*C22C 38/02* (2006.01)
*C22C 38/04* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/34* (2006.01)
(Continued)

(52) U.S. Cl.
CPC .......... *C21D 8/0263* (2013.01); *B32B 15/013* (2013.01); *C21D 8/0226* (2013.01); *C21D 8/0236* (2013.01); *C21D 8/0252* (2013.01); *C21D 8/0436* (2013.01); *C21D 8/0473* (2013.01); *C21D 8/0478* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/34* (2013.01); *C22C 38/38* (2013.01); *C23C 2/02* (2013.01); *C23C 2/06* (2013.01); *C23C 2/28* (2013.01); *C23C 2/40* (2013.01); *C21D 2211/005* (2013.01); *C21D 2211/008* (2013.01)

(58) Field of Classification Search
CPC ........ C21D 2211/005; C21D 2211/008; C21D 8/0226; C21D 8/0236; C21D 8/0252; C21D 8/0263; C21D 8/0436; C21D 8/0473; C21D 8/0478; C21D 9/46; C22C 38/001; C22C 38/002; C22C 38/005; C22C 38/02; C22C 38/04; C22C 38/06; C22C 38/08; C22C 38/12; C22C 38/14; C22C 38/16; C22C 38/34; C22C 38/38; C23C 2/02; C23C 2/06; C23C 2/28; C23C 2/40
USPC ................. 148/533, 620, 621, 645
See application file for complete search history.

(56) References Cited

U.S. PATENT DOCUMENTS

| 4,047,979 A | 9/1977 | Grange et al. |
| 2003/0106622 A1* | 6/2003 | Matsuoka ............ C21D 8/0226 148/603 |

(Continued)

FOREIGN PATENT DOCUMENTS

| EP | 2 039 791 | 3/2009 |
| EP | 2 757 169 | 7/2014 |

(Continued)

OTHER PUBLICATIONS

English translation of the Written Opinion of the International Search Authority mailed Dec. 25, 2012 for PCT/JP2012/006649; 4 pages.*
English translation of JP 2003/138345; May 2003; 11 pages.*
English translation of JP 01/259120; Oct. 1989; 6 pages.*
English translation of JP 07/188834; Jul. 1995; 7 pages.*
Corresponding Supplementary European Search Report dated Mar. 2, 2015 of European Application No. 12843086.5.

Primary Examiner — Helene Klemanski
(74) Attorney, Agent, or Firm — DLA Piper LLP (US)

(57) ABSTRACT

A method of manufacturing a high strength steel sheet having excellent formability suitable for the material of an automotive part has a tensile strength (TS) of 980 MPa or more and total elongation (EL) is 25% or more. A steel slab has a chemical composition containing C: 0.03% to 0.35%, Si: 0.5% to 3.0%, Mn: 3.5% to 10.0%, P: 0.100% or less, S: 0.02% or less, and the remainder includes Fe and incidental impurities on a percent by mass basis is hot-rolled, a heat treatment is performed, in which an achieved temperature of Ac1 to Ac1+100° C. is held for 3 minutes or more, subsequently, cold rolling is performed at a rolling reduction of 20% or more and, annealing is performed, in which an achieved temperature of Ac1−30° C. to Ac1+100° C. is held for 1 minute or more.

20 Claims, No Drawings

(51) Int. Cl.
*C22C 38/38* (2006.01)
*C23C 2/02* (2006.01)
*C23C 2/06* (2006.01)
*C23C 2/28* (2006.01)
*C23C 2/40* (2006.01)
*B32B 15/01* (2006.01)
*C22C 38/00* (2006.01)

(56) References Cited

U.S. PATENT DOCUMENTS

| | | | |
|---|---|---|---|
| 2008/0008901 A1 | 1/2008 | Sugiura et al. | |
| 2013/0133792 A1* | 5/2013 | Nakagaito | C22C 38/34 148/645 |
| 2014/0050941 A1* | 2/2014 | Kawasaki | C21D 9/46 148/533 |
| 2014/0230971 A1* | 8/2014 | Kawasaki | C23C 2/06 148/533 |

FOREIGN PATENT DOCUMENTS

| | | |
|---|---|---|
| JP | 01-259120 | 10/1989 |
| JP | 07-188834 | 7/1995 |
| JP | 2003-138345 | 5/2003 |
| JP | 2007-046146 | 2/2007 |

* cited by examiner

METHOD FOR MANUFACTURING HIGH STRENGTH STEEL SHEET HAVING EXCELLENT FORMABILITY

TECHNICAL FIELD

This disclosure relates to a method of manufacturing a high strength steel sheet having excellent formability suitable for application to automotive parts use.

BACKGROUND

In recent years, enhancement of fuel economy of the automobile has become an important issue from the viewpoint of global environmental conservation. Consequently, there is an active movement afoot to reduce the thickness of car body materials through increases in strength thereof and enhance fuel economy through weight reduction of a car body itself. A steel sheet formed into a product, e.g., an automotive part, by pressing or bending is required to have formability capable of bearing the forming while high strength is maintained. In Japanese Unexamined Patent Application Publication No. 1-259120, a high Mn steel achieves high strength and ductility by intercritical annealing. In Japanese Unexamined Patent Application Publication No. 2003-138345, a high Mn steel is hot rolled, the microstructure after hot rolling is a bainite•martensite microstructure, then a multiphase microstructure is established by annealing and tempering where fine retained austenite is formed and, furthermore, tempered bainite and tempered martensite are contained, so that local ductility is improved.

However, Japanese Unexamined Patent Application Publication No. 1-259120 above, no study has been made on improvements in formability due to concentration of Mn, and there is room for improvement in formability. In Japanese Unexamined Patent Application Publication No. 2003-138345, the microstructure contains a large proportion of bainite•martensite tempered at a high temperature and, therefore, has less-than-sufficient strength. In addition, the amount of retained austenite is limited to improve local ductility and, thereby, the total elongation is also insufficient.

It could therefore be helpful to provide a method of manufacturing a high strength steel sheet having excellent formability suitable for application to automotive parts use, where the tensile strength (TS) is 980 MPa or more and the total elongation (EL) is 25% or more.

SUMMARY

We found that by subjecting a steel in which the amount of addition of Mn was 3.5% or more and the amount of addition of Si was 0.5% or more, to hot rolling, performing a heat treatment in which an achieved temperature of $Ac_1$ to $Ac_1+100°$ C. was held for 3 minutes or more, performing cold rolling at a rolling reduction of 20% or more, and heating to an achieved temperature of $Ac_1-30°$ C. to $Ac_1+100°$ C. and holding for 1 minute or more during annealing or by subjecting a steel, in which the amount of addition of Mn was 3.5% or more and the amount of addition of Si was 0.5% or more, to hot rolling, performing cold rolling at a rolling reduction of 20% or more, performing a heat treatment in which an achieved temperature of $Ac_1$ to $Ac_1+100°$ C. was held for 3 minutes or more, and heating to an achieved temperature of $Ac_1-30°$ C. to $Ac_1+100°$ C. and holding for 1 minute or more during annealing.

We thus provide:

(1) A method of manufacturing a high strength steel sheet having excellent formability, characterized by including the steps of preparing a steel slab having a chemical composition containing C: 0.03% to 0.35%, Si: 0.5% to 3.0%, Mn: 3.5% to 10.0%, P: 0.100% or less, S: 0.02% or less, and the remainder comprising Fe and incidental impurities on a percent by mass basis, hot-rolling the steel slab, subjecting the hot rolled steel sheet to a heat treatment in which an achieved temperature of $Ac_1$ to $Ac_1+100°$ C. is held for 3 minutes or more, cold-rolling the steel sheet subjected to the heat treatment at a rolling reduction of 20% or more, and subjecting the cold rolled steel sheet to annealing in which an achieved temperature of $Ac_1-30°$ C. to $Ac_1+100°$ C. is held for 1 minute or more.

(2) A method of manufacturing a high strength steel sheet having excellent formability, characterized by including the steps of preparing a steel slab having a chemical composition containing C: 0.03% to 0.35%, Si: 0.5% to 3.0%, Mn: 3.5% to 10.0%, P: 0.100% or less, S: 0.02% or less, and the remainder comprising Fe and incidental impurities on a percent by mass basis, hot-rolling the steel slab, cold-rolling the hot rolled steel sheet at a rolling reduction of 20% or more, subjecting the cold rolled steel sheet to a heat treatment in which an achieved temperature of $Ac_1$ to $Ac_1+100°$ C. is held for 3 minutes or more, and subjecting the heat-treated steel sheet to annealing in which an achieved temperature of $Ac_1-30°$ C. to $Ac_1+100°$ C. is held for 1 minute or more.

(3) The method according to the item (1) or the item (2), wherein the above-described steel slab further contains Al: 0.01% to 2.00% on a percent by mass basis.

(4) The method according to the item (3), wherein the above-described Al content is 0.10% to 2.00% on a percent by mass basis.

(5) The method according to any one of the items (1) to (4), wherein the above-described steel slab further contains at least one element selected from Cr: 0.005% to 2.00%, Mo: 0.005% to 2.00%, V: 0.005% to 2.00%, Ni: 0.005% to 2.00%, and Cu: 0.005% to 2.00% on a percent by mass basis.

(6) The method according to any one of the items (1) to (5), wherein the above-described steel slab further contains at least one element selected from Ti: 0.005% to 0.20% and Nb: 0.005% to 0.20% on a percent by mass basis.

(7) The method according to any one of the items (1) to (6), wherein the above-described steel slab further contains B: 0.0003% to 0.0050% on a percent by mass basis.

(8) The method according to any one of the items (1) to (7), wherein the above-described steel slab further contains at least one element selected from Ca: 0.001% to 0.005% and REM: 0.001% to 0.005% on a percent by mass basis.

(9) The method according to any one of the items (1) to (8), wherein the above-described annealed steel sheet is subjected to hot-dip galvanization.

(10) The method according to any one of the items (1) to (8), wherein the above-described annealed steel sheet is subjected to hot-dip galvanization and, furthermore, an alloying treatment of zinc coating is performed.

(11) The method according to any one of the items (1) to (10), wherein the above-described high strength steel sheet having excellent formability is a high strength steel sheet having excellent formability which has TS: 980 MPa or more and EL: 25% or more.

(12) The method according to any one of the items (1) to (11), wherein the above-described C content is 0.07% to 0.25% on a percent by mass basis.

(13) The method according to any one of the items (1) to (12), wherein the above-described Si content is 0.8% to 2.3% on a percent by mass basis.

(14) The method according to any one of the items (1) to (13), wherein the above-described Mn content is 3.8% to 8.0% on a percent by mass basis.

(15) The method according to any one of the items (1) to (14), wherein the above-described Al content is 0.15% to 1.5% on a percent by mass basis.

(16) The method according to the item (15), wherein the above-described Al content is 0.20% to 1.0% on a percent by mass basis.

(17) The method according to any one of the items (1) to (16), wherein the above-described heat treatment is a heat treatment in which an achieved temperature of $Ac_1$ to $Ac_1+100°$ C. is held for 30 minutes or more.

A high strength steel sheet having excellent formability suitable for application to automotive parts use can be obtained, where the tensile strength (TS) is 980 MPa or more and the total elongation (EL) is 25% or more.

DETAILED DESCRIPTION

Our steel sheets and methods will be described below in detail. In this regard, "%" expressing the content of the component element refers to "percent by mass" unless otherwise specified.

1) Chemical Composition

C: 0.03% to 0.35%

Carbon is an element necessary to generate low temperature transformed phases of martensite, tempered martensite, and the like to increase TS. Also, carbon is an element effective in stabilizing austenite to generate retained austenite and improve formability of the steel. Generation of retained austenite becomes insufficient and it is difficult to obtain high formability if the amount of C is less than 0.03%. On the other hand, spot weldability is degraded if the amount of C is more than 0.35%. Therefore, the amount of C is 0.03% to 0.35%, preferably 0.07% to 0.25%.

Si: 0.5% to 3.0%

Silicon is an element effective in solid solution hardening the steel to improve TS and suppressing generation of carbides to generate retained austenite and improve formability of the steel. It is necessary that the amount of Si is 0.5% or more to obtain such effects. On the other hand, if Si is more than 3.0%, brittleness becomes considerable and degradation of surface quality and weldability are caused. Therefore, the amount of Si is 0.5% to 3.0%, preferably 0.8% to 2.3%.

Mn: 3.5% to 10.0%

Manganese is an element to induce solid solution hardening of the steel to improve TS and facilitate generation of low temperature transformed phases of martensite, tempered martensite, and the like. Also, Mn is an element effective in stabilizing austenite to generate retained austenite. It is necessary that the amount of Mn is 3.5% or more to obtain such effects. On the other hand, if the amount of Mn is more than 10.0%, ε martensite is easily generated and formability is degraded significantly. Therefore, the amount of Mn is 3.5% to 10.0%, preferably 3.8% to 8.0%.

P: 0.100% or less

Phosphorus degrades the steel because of grain boundary segregation and deteriorates weldability. Therefore, it is desirable that the amount thereof be minimized. However, the amount of P is preferably 0.100% or less from the viewpoint of production cost and the like.

S: 0.02% or less

Sulfur is present as inclusions, e.g., MnS, to cause degradation of weldability. Therefore, it is preferable that the amount thereof be minimized. However, the amount of S is preferably 0.02% or less from the viewpoint of production cost.

The remainder is composed of Fe and incidental impurities. As necessary, at least one of the following elements may be contained appropriately.

Al: 0.01% to 2.00%

Aluminum is an element effective in suppressing generation of carbides to generate retained austenite. Addition of 0.10% or more is preferable to obtain such effects. In this regard, if the amount of addition thereof is less than 2.00%, formation of austenite during heating is not hindered, and it becomes easy to obtain a low temperature transformed phase so that high strength and high formability are easily obtained. Therefore, the amount of Al is desirably 0.10% to 2.00%, more preferably 0.15% to 1.5%, and most preferably 0.20% to 1.0%. Meanwhile, from the viewpoint of inducing efficient deoxidation of steel, it is preferable that the content be 0.01% or more.

At least one selected from Cr: 0.005% to 2.00%, Mo: 0.005% to 2.00%, V: 0.005% to 2.00%, Ni: 0.005% to 2.00%, and Cu: 0.005% to 2.00%

Chromium, molybdenum, vanadium, nickel, and copper are elements effective in obtaining low temperature transformed phase of martensite and the like to enhance strength. It is preferable that the content of at least one element selected from Cr, Mo, V, Ni, and Cu is specified to be 0.005% or more to obtain such effects. Meanwhile, in the case where the content of each of Cr, Mo, V, Ni, and Cu is 2.00% or less, the effect thereof can be exerted without causing an increase in cost. Therefore, the content of each of Cr, Mo, V, Ni, and Cu is preferably 0.005% to 2.00%.

At least one selected from Ti: 0.005% to 0.20% and Nb: 0.005% to 0.20%

Titanium and niobium are elements effective in forming carbonitrides and enhancing the strength of steel through precipitation hardening. It is preferable that the contents of Ti and Nb are 0.005% or more to obtain such effects. Meanwhile, in the case where the contents of Ti and Nb are 0.20% or less, an effect of enhancing the strength can be obtained without reduction in EL. Therefore, the content of each of Ti and Ni is preferably 0.005% to 0.20%.

B: 0.0003% to 0.0050%

Boron is effective in suppressing generation of ferrite from austenite grain boundaries and obtaining a low temperature transformed phase to enhance the strength of steel. It is desirable that 0.0003% or more of B be contained to obtain such effects. Meanwhile, in the case where B is 0.0050% or less, the effect thereof can be exerted without causing an increase in cost. Therefore, the content of B is preferably 0.0003% to 0.0050%.

At least one selected from Ca: 0.001% to 0.005% and REM: 0.001% to 0.005%

Each of calcium and REM is an element effective in improving formability by controlling the form of sulfides. It is preferable that the content of at least one element selected from Ca and REM is 0.001% or more to obtain such effects. Meanwhile, in the case where the content of each of Ca and REM is 0.005% or less, the above-described characteristic can be improved without adversely affecting cleanliness of the steel. Therefore, the content of each of Ca and REM is preferably 0.001% to 0.005%.

2) Production Condition

A high strength steel sheet is produced by subjecting a steel slab having the above-described chemical composition to hot rolling, pickling, cold rolling at a rolling reduction of 20% or more, and a heat treatment, in which an achieved temperature of $Ac_1$ to $Ac_1+100°$ C. is held for 3 minutes or more, or hot rolling, a heat treatment, in which an achieved temperature of $Ac_1$ to $Ac_1+100°$ C. is held for 3 minutes or more, pickling, and cold-rolling at a rolling reduction of 20% or more and, thereafter, performing annealing in which the resultant steel sheet is heated to an achieved temperature of $Ac_1-30°$ C. to $Ac_1+100°$ C. and the temperature is held for 1 minute or more.

Moreover, it is also possible to perform a hot-dip galvanizing treatment after the above-described annealing treatment or further perform an alloying treatment of the zinc coating after the hot-dip galvanizing treatment.

A detailed description will be provided below.

Rolling reduction of cold rolling: 20% or more

Heat treatment condition: holding of achieved temperature of $Ac_1$ to $Ac_1+100°$ C. for 3 minutes or more The rolling reduction of cold rolling is very important. In the case where the cold rolling is performed at a rolling reduction of 20% or more, recrystallization of ferrite occurs in a heat treatment or annealing thereafter, and fine ductile recrystallized ferrite is obtained so that formability is improved. Also, austenite is finely divided by fine precipitation of ferrite, and more stabilized retained austenite is obtained so that formability is improved. In this regard, the Ac1 transition point was determined by the following equations:

$$Ac1(° C.)=751+500C+35Si-28Mn-16Ni-100$$
(C≤0.15%)

$$Ac1(° C.)=751+143C+35Si-28Mn-16Ni-30$$
(C>0.15%)

In the equations, symbols of elements represent the contents (percent by mass) of the respective elements in the steel.

The heat treatment may be performed before cold rolling or be performed after cold rolling and before annealing. Heat treatment performed before annealing is very important. Manganese is concentrated into austenite by this heat treatment and, thereby, austenite can be promptly generated during the annealing. Also, concentration of Mn into austenite during the annealing is facilitated and more stabilized retained austenite is obtained so that formability is improved. If the achieved temperature is lower than $Ac_1$, reverse transformation does not occur and Mn is not concentrated into austenite. On the other hand, if the achieved temperature is higher than $Ac_1+100°$ C., the amount of concentration of Mn into austenite is reduced because the volume fraction of ferrite is reduced, and austenite becomes unstable so that sufficient formability is not obtained. Therefore, the achieved temperature of the heat treatment is $Ac_1$ to $Ac_1+100°$ C.

If the holding time at the achieved temperature of $Ac_1$ to $Ac_1+100°$ C. is less than 3 minutes, diffusion of Mn does not occur sufficiently, the amount of concentration of Mn into austenite is reduced, and austenite becomes unstable so that sufficient formability is not obtained. Therefore, the holding time of the heat treatment is 3 minutes or more, preferably 30 minutes or more.

Annealing condition: holding of achieved temperature of $Ac_1-30°$ C. to $Ac_1+100°$ C. for 1 minute or more A cold rolled steel having a portion where Mn is concentrated is obtained by the above-described heat treatment before annealing. However, reverse transformation (transformation from ferrite to austenite) does not occur sufficiently at a temperature lower than $Ac_1-30°$ C. so that good formability is not obtained. On the other hand, if the achieved temperature is higher than $Ac_1+100°$ C., the amount of martensite generated after the annealing is excessively increased because the amount of generation of austenite due to reverse transformation increases so that good formability is not obtained. Therefore, the achieved temperature of the annealing is $Ac_1-30°$ C. to $Ac_1+100°$ C.

If the holding time is less than 1 minute, generation of austenite due to reverse transformation becomes insufficient and good formability is not obtained. Therefore, the holding time is 1 minute or more.

After the above-described annealing is performed, cooling to room temperature is performed. In the case where a hot-dip galvanizing treatment and an alloying treatment of the zinc coating are performed, it is preferable that the hot-dip galvanizing treatment be performed or, furthermore, the alloying treatment of the zinc coating be performed after the above-described annealing and before cooling to room temperature.

It is preferable that the hot-dip galvanizing treatment be performed by immersing the steel sheet (steel sheet after annealing) obtained as described above into a galvanization bath at 440° C. or higher and 500° C. or lower and, thereafter, adjusting the amount of coating deposition through gas wiping or the like. Preferably, a galvanization bath in which the amount of Al is 0.08 to 0.18 percent by mass is used for the galvanizing treatment. In addition, in the alloying treatment of the zinc coating, preferably, alloying is performed by holding at 460° C. or higher and 580° C. or lower for 1 second or more and 40 seconds or less.

The cold rolled steel sheet, the galvanized steel sheet, and the galvannealed steel sheet can be subjected to temper rolling for the purposes of shape correction, adjustment of surface roughness, and the like. Also, various painting treatments, e.g., resin coating or oil and/or fat coating, may be performed.

Other production conditions are not specifically limited, although it is preferable that the conditions be as described below.

It is preferable that a slab be produced by a continuous casting method to prevent macro segregation. However, production can also be performed by an ingot making method or a thin slab casting method. In hot rolling of the slab, the slab may be cooled to room temperature once and, thereafter, reheating and hot rolling may be performed, or the slab may be put into a heating furnace without being cooled to room temperature and be hot-rolled. Alternatively, an energy-saving process may be applied where hot rolling is performed immediately after a small extent of heat retaining is performed. In the case where the slab is heated, to dissolve carbides and prevent an increase in rolling load, heating to 1,100° C. or higher is preferable. Also, to prevent an increase in scale loss, it is preferable that the heating temperature of the slab is 1,300° C. or lower.

In hot rolling the slab, even in the case where the heating temperature of the slab is low, it is also possible to heat a rough bar after rough rolling from the viewpoint of prevention of trouble during rolling. In addition, a so-called "continuous" rolling process can be applied, where rough bars are joined to each other and finish rolling is performed continuously. The finish rolling is performed preferably at a finishing temperature higher than or equal to the $Ar_3$ transformation point since, otherwise, it may enhance the anisotropy and degrade formability after cold rolling•annealing.

Also, it is preferable that lubricated rolling, in which the coefficient of friction is 0.10 to 0.25, be performed in all passes or part of passes of the finish rolling for the purpose of reduction in rolling load and uniformity of shape and material properties. The coiling condition is preferably 350° C. or higher from the viewpoint of the shape stability of steel sheet. In this regard, if coiling is performed at a temperature higher than 650° C., ununiformity of an oxidation layer of the steel sheet surface becomes considerable and the surface quality is degraded. Therefore, the coiling temperature is preferably 650° C. or lower.

The coiled steel sheet is subjected to the heat treatment, the cold rolling, the annealing, and the hot-dip galvanization under the above-described conditions after scale is removed by pickling or the like.

EXAMPLES

Steel ingots having chemical compositions shown in Table 1 were prepared by melting in a vacuum melting furnace and rolled into steel slabs (in Table 1, N represents incidental impurities). These steel slabs were heated to 1200° C., then roughly rolled, finish-rolled, and coiled at 550° C. so that hot rolled steel sheets having sheet thicknesses of 2.3 mm were produced. Subsequently, a heat treatment was performed under the conditions shown in Tables 2 and 3, and pickling was performed. Then, cold rolled steel sheets were produced by cold rolling under the conditions shown in Tables 2 and 3 and were subjected to annealing. Meanwhile, part of steel slabs were hot rolled, pickled, and cold rolled under the conditions shown in Tables 2 and 3 and, then, were subjected to annealing after being heat-treated under the conditions shown in Tables 2 and 3.

Annealing was performed in a laboratory while a box annealing furnace, a continuous annealing line, and a continuous galvanizing and galvannealing line were simulated so that cold rolled steel sheets, galvanized steel sheets, and galvannealed steel sheets were produced. In this regard, the galvanized steel sheet was produced by performing annealing, immersion into a galvanization bath at 460° C. to form zinc coating (double-sided coating) at an amount of coating deposition of 35 to 45 g/m² per surface, and cooling at an average cooling rate of 10° C./sec. The galvannealed steel sheet was produced by performing an alloying treatment at 560° C. for 30 seconds after formation of zinc coating and cooling at an average cooling rate of 10° C./sec. JIS No. 5 tensile test pieces were taken from the resulting cold rolled steel sheets, galvanized steel sheets, and galvannealed steel sheets such that a tensile direction became in the direction at the right angle to the rolling direction and a tensile test was performed at a strain rate of $10^{-3}$/s. The results are shown in Tables 2 and 3.

TABLE 1

| Steel | Chemical composition (percent by mass) | | | | | | | | $Ac_1$ transformation point (° C.) | Remarks |
|---|---|---|---|---|---|---|---|---|---|---|
| | C | Si | Mn | P | S | Al | N | Others | | |
| A | 0.15 | 1.5 | 4.6 | 0.030 | 0.002 | 0.035 | 0.003 | — | 650 | Invention steel |
| B | 0.14 | 1.2 | 4.2 | 0.015 | 0.001 | 0.500 | 0.004 | — | 645 | Invention steel |
| C | 0.29 | 0.5 | 3.9 | 0.022 | 0.003 | 0.033 | 0.002 | — | 671 | Invention steel |
| D | 0.24 | 0.9 | 4.0 | 0.027 | 0.003 | 0.300 | 0.003 | — | 675 | Invention steel |
| E | 0.08 | 1.9 | 6.2 | 0.012 | 0.002 | 0.023 | 0.003 | — | 584 | Invention steel |
| F | 0.10 | 1.6 | 6.5 | 0.005 | 0.001 | 0.150 | 0.002 | — | 575 | Invention steel |
| G | 0.06 | 1.3 | 8.1 | 0.003 | 0.003 | 0.011 | 0.001 | Cr: 0.8 | 500 | Invention steel |
| H | 0.15 | 0.6 | 6.8 | 0.021 | 0.002 | 0.150 | 0.004 | Mo: 0.5 | 557 | Invention steel |
| I | 0.11 | 2.3 | 4.5 | 0.013 | 0.003 | 0.220 | 0.003 | V: 0.2 | 661 | Invention steel |
| J | 0.16 | 1.4 | 5.2 | 0.016 | 0.002 | 0.039 | 0.002 | Ni: 1.1 | 630 | Invention steel |
| K | 0.18 | 1.7 | 3.9 | 0.009 | 0.001 | 0.450 | 0.003 | Cu: 0.1 | 697 | Invention steel |
| L | 0.13 | 1.1 | 5.5 | 0.006 | 0.005 | 0.031 | 0.004 | Nb: 0.02 | 601 | Invention steel |
| M | 0.17 | 2.4 | 6.4 | 0.011 | 0.004 | 0.020 | 0.003 | Ti: 0.02, B: 0.0013 | 650 | Invention steel |
| N | 0.15 | 0.7 | 5.1 | 0.013 | 0.003 | 0.640 | 0.004 | Ca: 0.003 | 608 | Invention steel |
| O | 0.09 | 1.0 | 4.8 | 0.015 | 0.003 | 0.033 | 0.003 | REM: 0.001 | 597 | Invention steel |
| P | <u>0.01</u> | 1.4 | 6.6 | 0.022 | 0.003 | 0.028 | 0.001 | — | 520 | Comparative steel |
| Q | 0.12 | 1.5 | <u>10.5</u> | 0.025 | 0.003 | 0.035 | 0.002 | — | 470 | Comparative steel |
| R | 0.18 | 0.7 | <u>3.3</u> | 0.014 | 0.002 | 0.033 | 0.002 | — | 679 | Comparative steel |
| S | 0.14 | 0.5 | 4.5 | 0.019 | 0.001 | 0.200 | 0.002 | Ti: 0.01 | 613 | Invention steel |
| T | 0.19 | 1.4 | 5.3 | 0.008 | 0.001 | 0.050 | 0.004 | — | 649 | Invention steel |
| U | 0.10 | <u>0.2</u> | 5.1 | 0.010 | 0.002 | 0.041 | 0.003 | — | 565 | Comparative steel |

TABLE 2

| Steel sheet No. | Steel | Presence or absence of cold rolling before heat treatment | Heat treatment condition | | Presence or absence of cold rolling after heat treatment | Rolling reduction of cold rolling (%) | Annealing condition | | Presence or absence of coating* | Tensile characteristc | | Remarks |
|---|---|---|---|---|---|---|---|---|---|---|---|---|
| | | | Achieved temperature (° C.) | Holding time (min) | | | Achieved temperature (° C.) | Holding time (min) | | TS (MPa) | EL (%) | |
| 1 | A | present | 670 | 900 | none | 50 | 660 | 30 | CR | 994 | 35 | Invention example |
| 2 | | none | 650 | 3000 | present | 50 | 670 | 3 | CR | 1105 | 31 | Invention example |
| 3 | | present | <u>480</u> | 100 | none | 50 | 650 | 6 | CR | 920 | 22 | Comparative example |

TABLE 2-continued

| Steel sheet No. | Steel | Presence or absence of cold rolling before heat treatment | Heat treatment condition Achieved temperature (° C.) | Holding time (min) | Presence or absence of cold rolling after heat treatment | Rolling reduction of cold rolling (%) | Annealing condition Achieved temperature (° C.) | Holding time (min) | Presence or absence of coating* | Tensile characteristc value TS (MPa) | EL (%) | Remarks |
|---|---|---|---|---|---|---|---|---|---|---|---|---|
| 4 |   | present | 670 | 0.5 | none | 50 | 660 | 2 | CR | 976 | 23 | Comparative example |
| 5 |   | none | 700 | 100 | none | 0 | 650 | 3 | CR | 912 | 23 | Comparative example |
| 6 | B | none | 650 | 1500 | present | 50 | 660 | 20 | GA | 1031 | 33 | Invention example |
| 7 |   | present | 650 | 6000 | none | 50 | 670 | 1000 | GA | 1009 | 36 | Invention example |
| 8 |   | none | 780 | 600 | present | 50 | 650 | 10 | GA | 896 | 27 | Comparative example |
| 9 |   | none | 650 | 600 | present | 50 | 780 | 90 | GA | 1365 | 9 | Comparative example |
| 10 | C | none | 680 | 120 | present | 30 | 690 | 1500 | GI | 1301 | 38 | Invention example |
| 11 |   | none | 680 | 120 | present | 30 | 620 | 240 | GI | 960 | 20 | Comparative example |
| 12 | D | present | 680 | 300 | none | 70 | 700 | 10 | CR | 1238 | 37 | Invention example |
| 13 |   | none | 680 | 1800 | present | 70 | 700 | 15 | CR | 1244 | 38 | Invention example |
| 14 |   | present | 680 | 1800 | none | 70 | 700 | 0 | CR | 1012 | 18 | Comparative example |
| 15 | E | none | 625 | 240 | present | 70 | 630 | 70 | GA | 1056 | 35 | Invention example |

*CR: no coating (cold rolled steel sheet, where No. 5 is hot rolled and annealed steel sheet),
GI: galvanized steel sheet,
GA: galvannealed steel sheet

TABLE 3

| Steel sheet No. | Steel | Presence or absence of cold rolling before heat treatment | Heat treatment condition Achieved temperature (° C.) | Holding time (min) | Presence or absence of cold rolling after heat treatment | Rolling reduction of cold rolling (%) | Annealing condition Achieved temperature (° C.) | Holding time (min) | Presence or absence of coating* | Tensile characteristic value TS (MPa) | EL (%) | Remarks |
|---|---|---|---|---|---|---|---|---|---|---|---|---|
| 16 | F | present | 625 | 4000 | none | 40 | 640 | 5 | GI | 1238 | 35 | Invention example |
| 17 | G | none | 550 | 3000 | present | 40 | 550 | 60 | GA | 1196 | 33 | Invention example |
| 18 | H | present | 625 | 4500 | none | 40 | 625 | 1000 | GI | 1421 | 30 | Invention example |
| 19 | I | present | 670 | 800 | none | 60 | 650 | 120 | CR | 988 | 30 | Invention example |
| 20 | J | none | 650 | 400 | present | 60 | 650 | 60 | GA | 1224 | 33 | Invention example |
| 21 | K | none | 700 | 3000 | present | 60 | 710 | 1 | GI | 1068 | 28 | Invention example |
| 22 | L | none | 640 | 1500 | present | 80 | 650 | 1000 | CR | 1165 | 30 | Invention example |
| 23 | M | present | 670 | 900 | none | 80 | 680 | 5 | GA | 1050 | 36 | Invention example |
| 24 | N | present | 650 | 900 | none | 80 | 650 | 2400 | GI | 1093 | 29 | Invention example |
| 25 | O | present | 650 | 300 | none | 50 | 650 | 75 | CR | 1236 | 28 | Invention example |
| 26 | P | none | 575 | 1500 | present | 50 | 580 | 30 | CR | 879 | 19 | Comparative example |
| 27 | Q | none | 500 | 120 | present | 50 | 520 | 3 | GA | 1305 | 11 | Comparative example |
| 28 | R | none | 700 | 1000 | present | 50 | 700 | 120 | GA | 1024 | 19 | Comparative example |
| 29 | S | present | 650 | 500 | none | 30 | 670 | 2 | GA | 1049 | 26 | Invention example |
| 30 | T | none | 660 | 15 | present | 50 | 680 | 2 | GI | 1295 | 26 | Invention example |

TABLE 3-continued

| Steel sheet No. | Steel | Presence or absence of cold rolling before heat treatment | Heat treatment condition | | Presence or absence of cold rolling after heat treatment | Rolling reduction of cold rolling (%) | Annealing condition | | Presence or absence of coating* | Tensile characteristic value | | Remarks |
|---|---|---|---|---|---|---|---|---|---|---|---|---|
| | | | Achieved temperature (°C.) | Holding time (min) | | | Achieved temperature (°C.) | Holding time (min) | | TS (MPa) | EL (%) | |
| 31 | | none | <u>600</u> | 15 | present | 50 | 665 | 2 | GI | 1066 | 22 | Comparative example |
| 32 | | none | 680 | 200 | present | <u>10</u> | 700 | 30 | GA | 1314 | 13 | Comparative example |
| 33 | | none | 700 | 30 | present | 70 | 650 | <u>0.3</u> | GA | 977 | 21 | Comparative example |
| 34 | U | present | 650 | 100 | none | 50 | 660 | 10 | CR | 895 | 27 | Comparative example |

*CR: no coating (cold rolled steel sheet),
GI: galvanized steel sheet,
GA: galvannealed steel sheet In our examples, TS was 980 MPa or more and EL was 25% or more, and it was ascertained that high strength and formability were provided. On the other hand, in the comparative examples, at least one of TS and EL is poor.

INDUSTRIAL APPLICABILITY

A high strength steel sheet having excellent formability, where the tensile strength (TS) is 980 MPa or more and the total elongation (EL) is 25% or more, can be obtained. Application of our high strength steel sheets to automotive parts use can significantly contribute to weight reduction of automobiles and enhancement of performances of automotive bodies.

The invention claimed is:

1. A method of manufacturing a high strength steel sheet having excellent formability comprising:
    preparing a steel slab having a chemical composition containing C: 0.03% to 0.35%, Si: 0.5% to 3.0%, Mn: 3.5% to 10.0%, P: 0.100% or less, S: 0.02% or less, and the remainder comprising Fe and incidental impurities on a percent by mass basis;
    hot-rolling the steel slab;
    subjecting the hot rolled steel sheet to a heat treatment in which an achieved temperature of $Ac_1$ to $Ac_1+100°$ C. is held for 3 minutes or more;
    cold-rolling the steel sheet subjected to the heat treatment at a rolling reduction of 20% or more; and
    subjecting the cold rolled steel sheet to annealing in which an achieved temperature of $Ac_1-30°$ C. to $Ac_1+100°$ C. is held for 1 minute or more.

2. A method of manufacturing a high strength steel sheet having excellent formability comprising:
    preparing a steel slab having a chemical composition containing C: 0.03% to 0.35%, Si: 0.5% to 3.0%, Mn: 3.5% to 10.0%, P: 0.100% or less, S: 0.02% or less, and the remainder comprising Fe and incidental impurities on a percent by mass basis;
    hot-rolling the steel slab;
    cold-rolling the hot rolled steel sheet at a rolling reduction of 20% or more;
    subjecting the cold rolled steel sheet to a heat treatment in which an achieved temperature of $Ac_1$ to $Ac_1+100°$ C. is held for 3 minutes or more; and
    subjecting the heat-treated steel sheet to annealing in which an achieved temperature of $Ac_1-30°$ C. to $Ac_1+100°$ C. is held for 1 minute or more.

3. The method according to claim 1, wherein the steel slab further contains Al: 0.01% to 2.00% on a percent by mass basis.

4. The method according to claim 3, wherein the Al content is 0.10% to 2.00% on a percent by mass basis.

5. The method according to claim 1, wherein the steel slab further contains at least one element selected from the group consisting of Cr: 0.005% to 2.00%, Mo: 0.005% to 2.00%, V: 0.005% to 2.00%, Ni: 0.005% to 2.00%, and Cu: 0.005% to 2.00% on a percent by mass basis.

6. The method according to claim 1, wherein the steel slab further contains at least one element selected from the group consisting of Ti: 0.005% to 0.20% and Nb: 0.005% to 0.20% on a percent by mass basis.

7. The method according to claim 1, wherein the steel slab further contains B: 0.0003% to 0.0050% on a percent by mass basis.

8. The method according to claim 1, wherein the steel slab further contains at least one element selected from the group consisting of Ca: 0.001% to 0.005% and REM: 0.001% to 0.005% on a percent by mass basis.

9. The method according to claim 1, further comprising subjecting the annealed steel sheet to hot-dip galvanization.

10. The method according to claim 1, further comprising subjecting the annealed steel sheet to hot-dip galvanization and performing an alloying treatment of zinc coating.

11. The method according to claim 1, wherein the high strength steel sheet has TS: 980 MPa or more and EL: 25% or more.

12. The method according to claim 1, wherein the C content is 0.07% to 0.25% on a percent by mass basis.

13. The method according to claim 1, wherein the Si content is 0.8% to 2.3% on a percent by mass basis.

14. The method according to claim 1, wherein the Mn content is 3.8% to 8.0% on a percent by mass basis.

15. The method according to claim 3, wherein the Al content is 0.15% to 1.5% on a percent by mass basis.

16. The method according to claim 15, wherein the Al content is 0.20% to 1.0% on a percent by mass basis.

17. The method according to claim 1, wherein the heat treatment is a heat treatment in which an achieved temperature of $Ac_1$ to $Ac_1+100°$ C. is held for 30 minutes or more.

18. The method according to claim 2, wherein the steel slab further contains Al: 0.01% to 2.00% on a percent by mass basis.

19. The method according to claim 18, wherein the Al content is 0.10% to 2.00% on a percent by mass basis.

20. The method according to claim 2, wherein the steel slab further contains at least one element selected from the group consisting of Cr: 0.005% to 2.00%, Mo: 0.005% to 2.00%, V: 0.005% to 2.00%, Ni: 0.005% to 2.00%, and Cu: 0.005% to 2.00% on a percent by mass basis.

* * * * *